United States Patent
Lin et al.

(10) Patent No.: US 11,951,477 B2
(45) Date of Patent: Apr. 9, 2024

(54) FLOW CELL WITH INTEGRATED MANIFOLD

(71) Applicant: Illumina, Inc., San Diego, CA (US)

(72) Inventors: Sz-Chin Lin, San Diego, CA (US); Jay Taylor, San Diego, CA (US); Minsoung Rhee, San Diego, CA (US); Jennifer Foley, San Diego, CA (US); Wesley Cox-Muranami, San Diego, CA (US); Cyril Delattre, San Diego, CA (US); Tarun Khurana, San Diego, CA (US); Paul Crivelli, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 0 days.

(21) Appl. No.: 17/809,604

(22) Filed: Jun. 29, 2022

(65) Prior Publication Data
US 2022/0323955 A1    Oct. 13, 2022

Related U.S. Application Data

(63) Continuation of application No. 16/400,629, filed on May 1, 2019, now Pat. No. 11,376,584.
(Continued)

(51) Int. Cl.
*B01L 3/00* (2006.01)
*G01N 21/05* (2006.01)

(52) U.S. Cl.
CPC ... *B01L 3/502715* (2013.01); *B01L 3/502707* (2013.01); *B01L 3/502738* (2013.01);
(Continued)

(58) Field of Classification Search
CPC .......... G01N 2035/00247; G01N 21/05; B01L 3/502715; B01L 3/502707;
(Continued)

(56) References Cited

U.S. PATENT DOCUMENTS 6,830,729 B1 * 12/2004 Holl ...................... G01N 15/14
                                                422/537
6,901,956 B2    6/2005 Krog et al.
(Continued)

FOREIGN PATENT DOCUMENTS

CN    1767899 A    5/2006
CN    1962092 A    5/2007
(Continued)

*Primary Examiner* — Brian J. Sines
(74) *Attorney, Agent, or Firm* — Stephen P. Scuderi; Heslin Rothenberg Farley & Mesiti PC (57) ABSTRACT

An example method includes connecting a flow cell to an instrument. The flow cell includes a flow channel including a manifold section having a manifold section swept volume and a detection section having a detection section swept volume. A ratio of the detection section swept volume to manifold section swept volume is at least 10 to 1. A first reagent is pumped through the flow channel. A first chemical reaction is performed between the first reagent and analytes positioned in the detection section. A subsequent reagent is pumped through the flow channel to flush out the remaining reagent. A concentration of at least 99.95 percent of reagent positioned in the detection section is the subsequent reagent, after pumping a total volume of the subsequent reagent through the flow channel that is equal to or less than 2.5 times a total swept volume of the manifold section plus the detection section.

13 Claims, 7 Drawing Sheets

Related U.S. Application Data (60) Provisional application No. 62/666,897, filed on May 4, 2018.

(52) U.S. Cl.
CPC ...... *G01N 21/05* (2013.01); *B01L 2300/0861* (2013.01); *B01L 2400/0622* (2013.01); *B01L 2400/08* (2013.01)

(58) Field of Classification Search
CPC ....... B01L 3/502738; B01L 2300/0861; B01L 2400/0622; B01L 2400/08
See application file for complete search history.

(56) References Cited

U.S. PATENT DOCUMENTS

| | | | |
|---|---|---|---|
| 9,381,512 | B2 | 7/2016 | Cohen et al. |
| 11,376,584 | B2 * | 7/2022 | Lin ................ G01N 21/05 |
| 2002/0071788 | A1 | 6/2002 | Fujii et al. |
| 2006/0019273 | A1 | 1/2006 | Connolly et al. |
| 2007/0172837 | A1 | 7/2007 | Schleifer et al. |
| 2007/0178582 | A1 | 8/2007 | Koser |
| 2009/0318303 | A1 | 12/2009 | Delamarche et al. |
| 2009/0325159 | A1 | 12/2009 | Zeng et al. |
| 2011/0014606 | A1 | 1/2011 | Steinmetzer et al. |
| 2013/0345096 | A1 | 12/2013 | Wan |
| 2015/0060303 | A1 | 3/2015 | Blohm et al. |
| 2018/0280973 | A1 | 10/2018 | Haeberle et al. |
| 2019/0224676 | A1 | 7/2019 | Cox-Muranami |

FOREIGN PATENT DOCUMENTS

| | | |
|---|---|---|
| CN | 102026726 A | 4/2011 |
| CN | 202066861 U | 12/2011 |
| CN | 106215985 | 12/2016 |
| EP | 2625526 | 3/2017 |
| JP | 2001004628 | 1/2001 |
| JP | 2002236131 | 8/2002 |
| JP | 2003202347 | 7/2003 |
| JP | 2006043696 A | 2/2006 |
| JP | 2007209910 A | 8/2007 |
| JP | 2010502217 A | 1/2010 |
| JP | 2011525109 A | 9/2011 |
| JP | 2011022031 | 12/2013 |
| JP | 2018057366 | 4/2018 |
| TW | 200914831 | 4/2009 |
| WO | 2017065163 A | 4/2017 |

* cited by examiner

FLOW CELL WITH INTEGRATED MANIFOLD

CROSS-REFERENCE TO RELATED APPLICATIONS

This application is a continuation of, and claims the benefit of the filing date of, U.S. patent application Ser. No. 16/400,629, filed May 1, 2019, entitled: "FLOW CELL WITH INTEGRATED MANIFOLD;" which is a non-provisional of, and which this application also claims the benefit of the filing date of, U.S. provisional application 62/666,897, filed May 4, 2018, entitled, "FLOW CELL WITH INTEGRATED MANIFOLD." The contents of the prior applications are incorporated herein by reference.

BACKGROUND

Many instruments that use microfluidic devices may include a plurality of reagent wells that contain a variety of reagents, wherein each reagent well is connected to a rotary selector valve. The rotary valve aligns with each well channel in order to select any one of the reagents. A common line is then utilized to route the selected reagents from the rotary valve to an inlet port of a flow cell. Analytes, such as DNA segments, nucleic-acid chains or the like, may be positioned in the flow channel. The selected reagents may flow through the flow cell in order to perform various controlled chemical reactions on the analytes.

In order to minimize, and in some instances even entirely eliminate, cross contamination of reagents, each reagent utilized in the sequence of chemical reactions often is flushed out of both the common line that is external to the flow cell (i.e., an external common line) and the flow cell to a predetermined flush efficiency by the next reagent (or flushing reagent) in the sequence.

However, reagents utilized in such sequenced chemical reactions may be very expensive. Further, achieving such levels of flush efficiency in the flow channel of the flow cell often requires flushing a volume of reagent through the flow channel that is many times the swept volume of the flow channel. For example, achieving a flush efficiency of a predetermined concentration of a reagent positioned in the flow channel, may involve flushing a volume of that reagent through the flow channel that is 5 to 10 times the swept volume of the flow channel.

One of the reasons that such high volumes, and therefore such high flush factors, of reagents are involved is that the swept volume of an external common line in an instrument is often high compared to the swept volume of the flow channel. Often the swept volume of the common line that is external to the flow cell is two or more times the swept volume of the flow cell itself, wherein both may be flushed in order to achieve the flush efficiencies involved for the sequential chemical reactions.

Additionally, the flow path through the external common line and the flow path through the flow channel of the flow cell are often not in the same plane. For example, the common line may include fittings, manifolds, layers, materials or the like that causes sharp bends in the flow path (e.g., at right angles or greater) in order to connect to the flow cell and/or the rotary valve. Also by way of example, reagent wells are often positioned at a different level than the flow cell within an instrument, and the external common line often may adjust for this difference.

These level changes and sharp bends can contribute to areas of significantly slower flow (herein, dead areas) than that of the reagent flow through most of the flow path. Dead areas may be areas of slow moving laminar flow, eddies or vortices that can trap reagent and make it difficult to flush the reagent out. These dead areas in some instances may require a significant amount of flushing reagent volume to flush out a previously positioned reagent that remains after a previous chemical reaction (e.g., a remaining reagent) caught in those dead areas. Further, fittings and other mechanical connections between the common line and the rotary valve, or between the common line and the flow cell, can also contribute to additional dead areas, which can increase the volume of flushing reagent involved to achieve a certain flush efficiency.

BRIEF DESCRIPTION

The present disclosure provides examples of an apparatus and method for reducing, relative to the prior art, the volume of reagent flow (i.e., total flush volume) involved to flush a flow cell and achieve a predetermined level of reagent concentration (i.e., flush efficiency) in a flow channel of the flow cell. More specifically, the present disclosure provides examples of a flow cell, wherein a flow channel has a detection section and a manifold section integrated therein. The detection section is an area of the flow channel where chemical reactions are performed between analytes and various reagents. The manifold section provides an internal common line area for reagent flows prior to entering the detection section.

The present disclosure provides examples wherein the manifold section is small relative to the detection section to reduce the total flush volume used to achieve a certain flush efficiency. The present disclosure provides examples wherein the manifold section and detection section are in the same plane, or planar, to help reduce dead areas of reagent flow. Further the present disclosure provides examples of the manifold section having reagent flow path junctions formed solely at acute angles to also help reduce dead areas of reagent flow.

A flow cell in accordance with one or more aspects of the present disclosure includes a plurality of inlet ports sized to receive a flow of reagent from one of a plurality of reagents into the flow cell. An outlet port of the flow cell is sized to pass each flow of reagent out of the flow cell. A flow channel of the flow cell is positioned between, and in fluid communication with, each inlet port and the outlet port. The flow channel includes a manifold section and a detection section. The manifold section has a plurality of manifold branches in fluid communication with a common line, wherein each branch is connected to one of each inlet port. The detection section is in fluid communication with the common line and the outlet port. The detection section is operable to perform a plurality of different chemical reactions between the plurality of reagents and analytes positioned in the detection section.

An instrument in accordance with one or more aspects of the present disclosure includes a plurality of reagent wells. Each reagent well is operable to contain a reagent of a plurality of reagents positioned therein. A plurality of valves of the instrument is in fluid communication with one of each reagent well. Each valve is operable to control a flow of reagent from the reagent well that the valve is in communication with. A flow cell is positioned within the instrument. The flow cell includes a plurality of inlet ports, an outlet port and a flow channel positioned therebetween. Each inlet port is in fluid communication with one of each valve, and each inlet port is sized to receive one of each flow of reagent. The outlet port is sized to pass each flow of reagent out of the flow cell. The flow channel is in fluid communication with each inlet port and the outlet port. The flow channel includes a manifold section and a detection section. The manifold section has a plurality of manifold branches in fluid communication with a common line, wherein each branch is connected to an inlet port. The detection section is in fluid communication with the common line and the outlet port. The detection section is operable to perform a plurality of different chemical reactions between the plurality of reagents and analytes positioned in the detection section.

A method in accordance with one or more aspects of the present disclosure includes connecting a flow cell to an instrument. The flow cell includes a plurality of inlet ports, an outlet port and a flow channel in fluid communication therebetween. The flow channel includes a manifold section having a manifold section swept volume and a detection section having a detection section swept volume, wherein a ratio of the detection section swept volume to manifold section swept volume is at least about 10 to 1. A first valve of a plurality of valves of the instrument is operated to select a first reagent of a plurality of reagents. Each reagent is positioned in a reagent well of one of a cartridge or the instrument. The first reagent is pumped through a first inlet port of the plurality of inlet ports and through the flow channel of the flow cell. A first chemical reaction is performed between the first reagent and analytes positioned in the detection section of the flow channel. At least some of the first reagent will remain in the flow channel as a remaining reagent after completion of the first chemical reaction. A subsequent valve of the plurality of valves is operated to select a subsequent reagent of the plurality of reagents. The subsequent reagent is pumped through a subsequent inlet port of the plurality of inlet ports and through the flow channel to flush out the remaining reagent from the flow channel. Due at least in part to the ratio of the detection section swept volume to the manifold section swept volume being at least about 10 to 1, a concentration of at least about 99.95 percent of reagent positioned in the detection section is the subsequent reagent, after pumping a total volume of the subsequent reagent through the flow channel that is equal to or less than about 2.5 times a total swept volume of the manifold section plus the detection section.

Another method in accordance with one or more aspects of the present disclosure includes connecting a flow cell to an instrument. The flow cell includes a flow channel including a manifold section having a manifold section swept volume and a detection section having a detection section swept volume. A ratio of the detection section swept volume to manifold section swept volume is at least 10 to 1. A first reagent is pumped through the flow channel. A first chemical reaction is performed between the first reagent and analytes positioned in the detection section. A subsequent reagent is pumped through the flow channel to flush out the remaining reagent. A concentration of at least 99.95 percent of reagent positioned in the detection section is the subsequent reagent, after pumping a total volume of the subsequent reagent through the flow channel that is equal to or less than 2.5 times a total swept volume of the manifold section plus the detection section.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "substantially", "approximately", "about", "relatively," or other such similar terms that may be used throughout this disclosure, including the claims, are used to describe and account for small fluctuations, such as due to variations in processing, from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Flush efficiency, as used herein, is the percent concentration by volume of the flushing reagent that remains in the area of the flow channel where the analytes are located after a flushing operation. Often, the desirable flush efficiency to be achieved ranges from 96% to 100% concentration of flushing reagent in the flow channel depending on the parameters of the chemical reaction to be performed.

Swept volume, as used herein, is the internal volume of a component in the flow path of a reagent. Therefore, the swept volume of the flow channel is the total internal volume of the flow channel of the flow cell. Also, flush factor, as used herein, is the volume of a reagent flushed through a component expressed in units of swept volume of that component. Therefore, total flush volume is the swept volume multiplied by the flush factor.

Therefore, for example, if a flow channel requires 10 times its swept volume of a reagent to be flushed though the flow channel to achieve a predetermined flush efficiency, the reagent's flush factor to achieve that flush efficiency is 10 (or 10 in units of swept volume). Moreover, if that flow channel has a swept volume of 5 micro liters, then the total flush volume to achieve that flush efficiency is 50 micro liters (i.e., 5 micro liters (swept volume)×10 (flush factor)).

Figure 5:
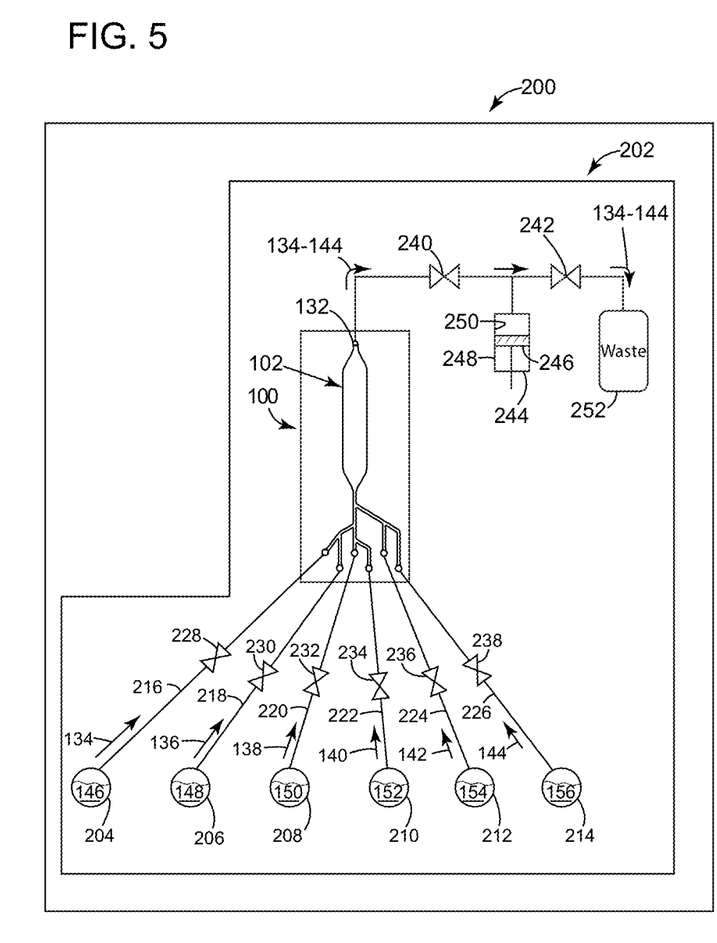
FIG. 5 depicts an example of a schematic diagram of a cartridge of an instrument containing the flow cell of FIG. 2 according to aspects disclosed herein.
Figure 6:
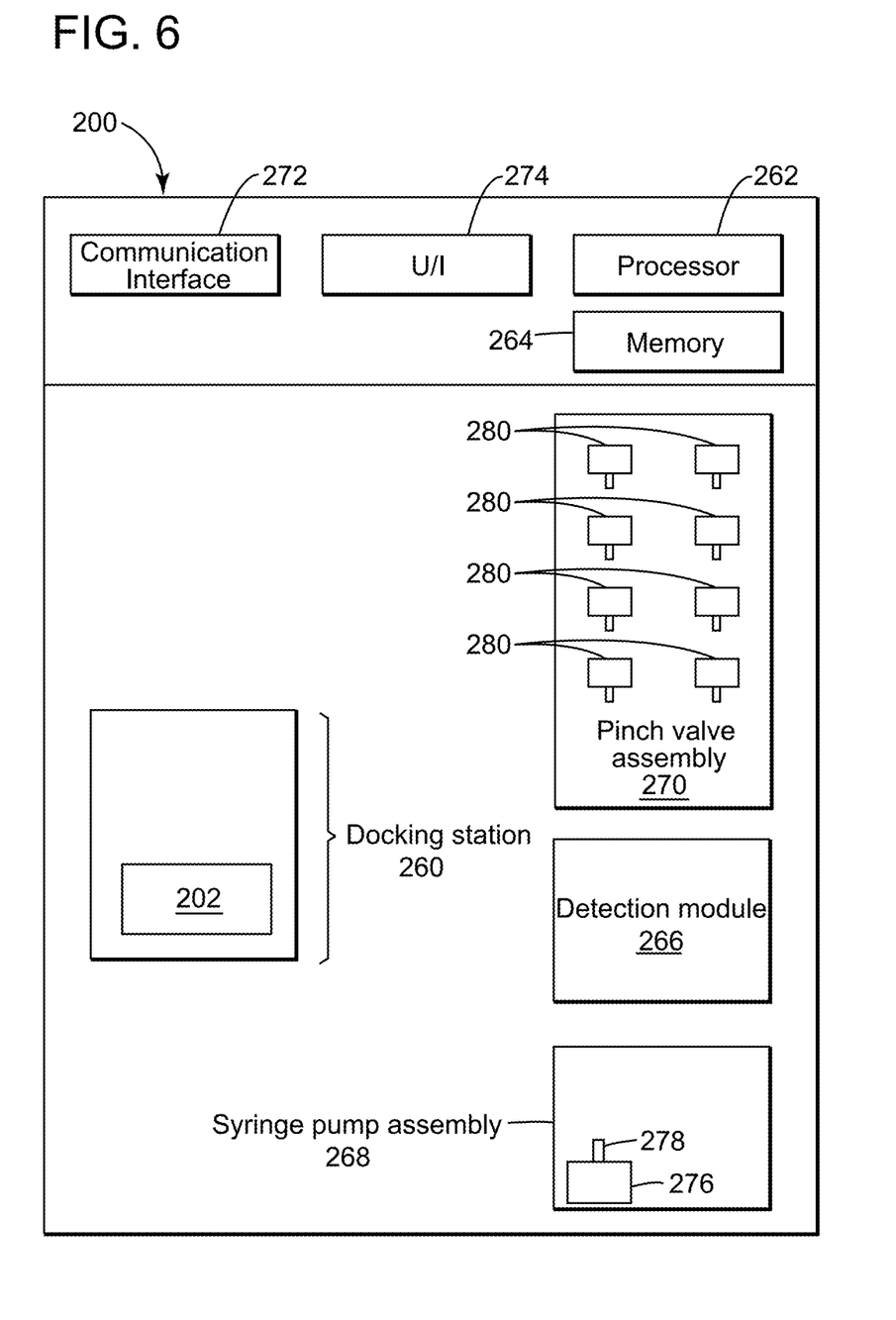
FIG. 6 depicts an example of a schematic block diagram of the instrument containing the cartridge of FIG. 5 according to aspects disclosed herein.
Figure 7:
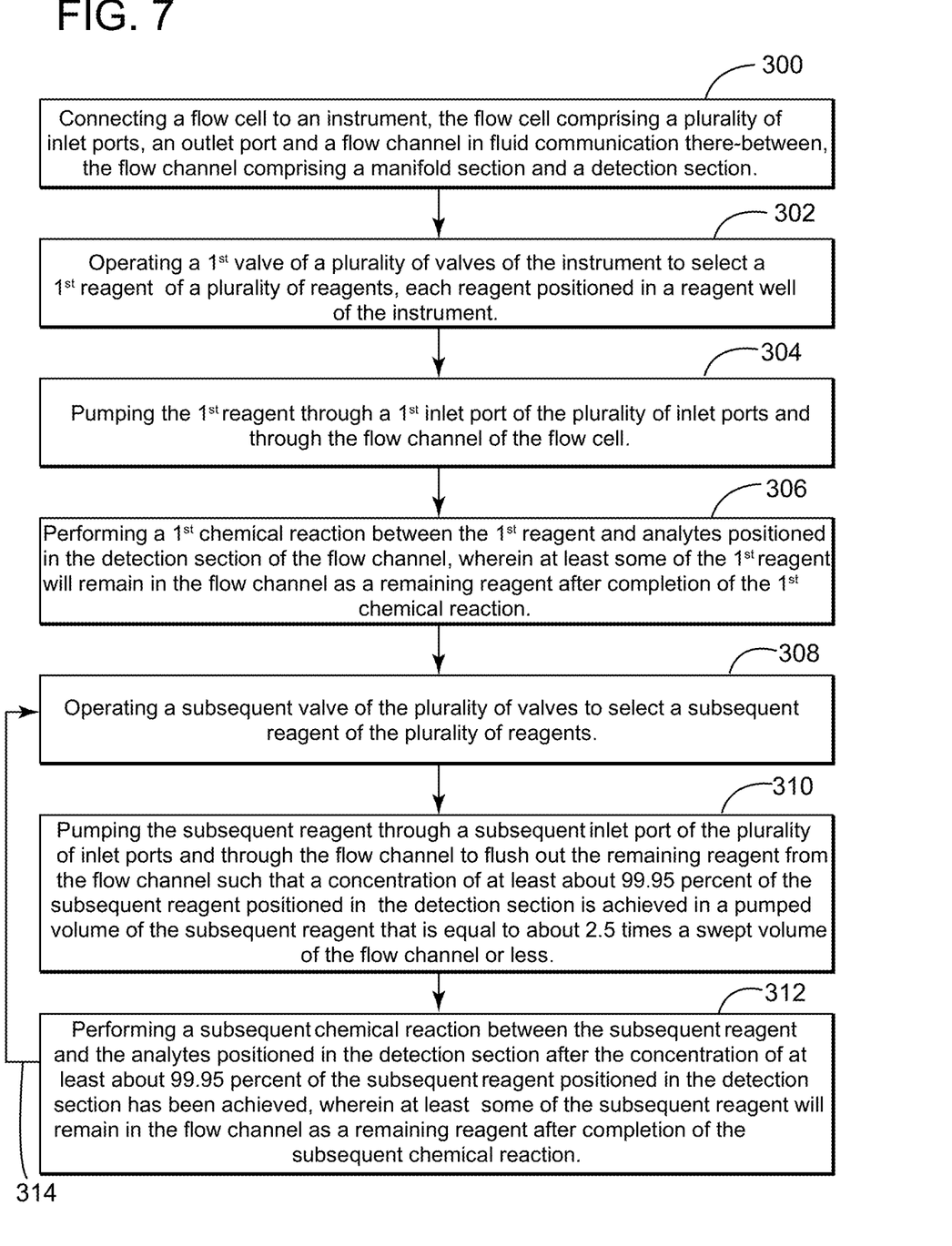
FIG. 7 depicts an example of a flow diagram of a method of performing a sequence of experiments utilizing a flow cell according to aspects disclosed herein.

FIGS. 1A-4 illustrate various examples of a flow cell according to aspects disclosed herein. FIGS. 5-6 illustrate various examples of an instrument according to aspects disclosed herein. FIG. 7 illustrates various examples of a method according to aspects disclosed herein.

Figure 1A:
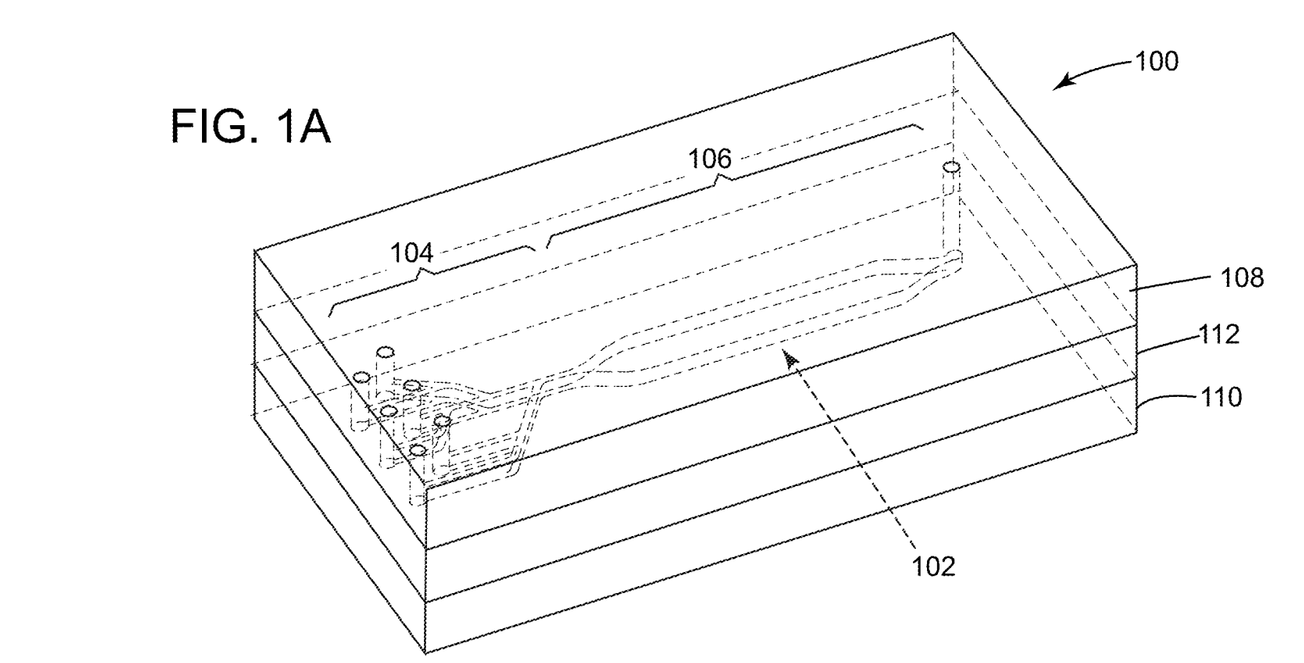
FIG. 1A depicts an example of a perspective view of a flow cell having a flow channel, wherein the flow channel includes a manifold section and a detection section according to aspects disclosed herein.
Figure 1B:
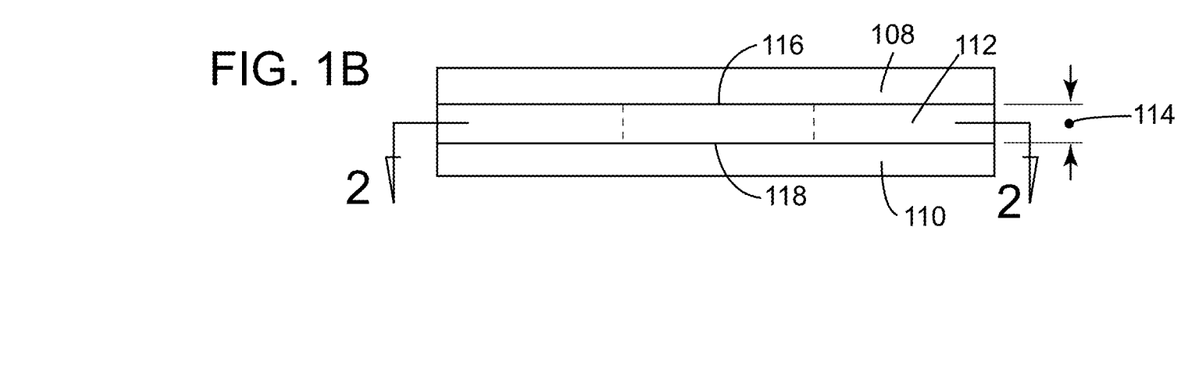
FIG. 1B depicts an example of a front side view of the flow cell of FIG. 1A according to aspects disclosed herein.

Referring to FIGS. 1A and 1B, a perspective view (FIG. 1A) and a front side view (FIG. 1B) of a flow cell 100 having a flow channel 102 is depicted. The flow channel 102 includes a manifold section 104 and a detection section 106 (best seen in FIG. 2) according to aspects disclosed herein. The manifold section 104 and detection section 106 are integrally connected in fluid communication together within the flow cell 100.

The flow cell 100 of FIGS. 1A and 1B also includes a top layer 108 defining a top surface 116 of the flow channel 102 and a bottom layer 110 defining a bottom surface 118 of the flow channel 102. An intermediate layer 112 is positioned between the top layer 108 and bottom layer 110. The intermediate layer 112 defines a geometry of the flow channel 102.

The top, bottom and intermediate layers 108, 110, 112 may be composed of glass, silicon, a polymer or other material that is capable of meeting application requirements of any of the layers 108, 110, 112. Examples of a polymer that may be used in any of the three layers 108, 110, 112 are: a polycarbonate, a polymethyl methacrylate, a polyimide, a polyethylene terephthalate, a polyester, a cyclic olefin copolymer (COC) and a cyclic olefin polymer (COP). The COC and the COP are examples of optically clear polymers, which are often used in the top and bottom layers 108, 110. The three layers 108, 110, 112 may be composed of the same materials or they may be composed of different materials.

The three layers 108, 110, 112 may be bonded together with various adhesives such as pressure sensitive or heat activated adhesives. Additionally, the layers 108, 110, 112 may be thermally bonded or laser welded.

The intermediate layer 112 is illustrated in FIGS. 1A and 1B as a single layer. However, the intermediate layer 112 may be a stack of layers bonded together to define the geometry of the flow channel 102. Additionally, with the stack of layers, the manifold section 104 may be made to have a different height as the detection section 106. For example, the intermediate layer 112 may be composed of a stack of 6 layers, wherein the bottom three layers of the stack compose the manifold section and the entire stack of 6 layers compose the detection section.

The flow channel 102 of the flow cell 100 includes a gap height 114. The gap height 114 is defined by a distance between the bottom surface 118 of the flow channel and the top surface 116 of the flow channel. The gap height 114, as illustrated in FIGS. 1A and 1B, is substantially constant throughout the flow channel 102. By way of example, the gap height 114 in some flow channels 102 may be between about 10 microns and about 100 microns. For example, the gap height 114 may be about 10 microns, about 20 microns, about 50 microns, about 60 microns or about 100 microns.

Figure 2:
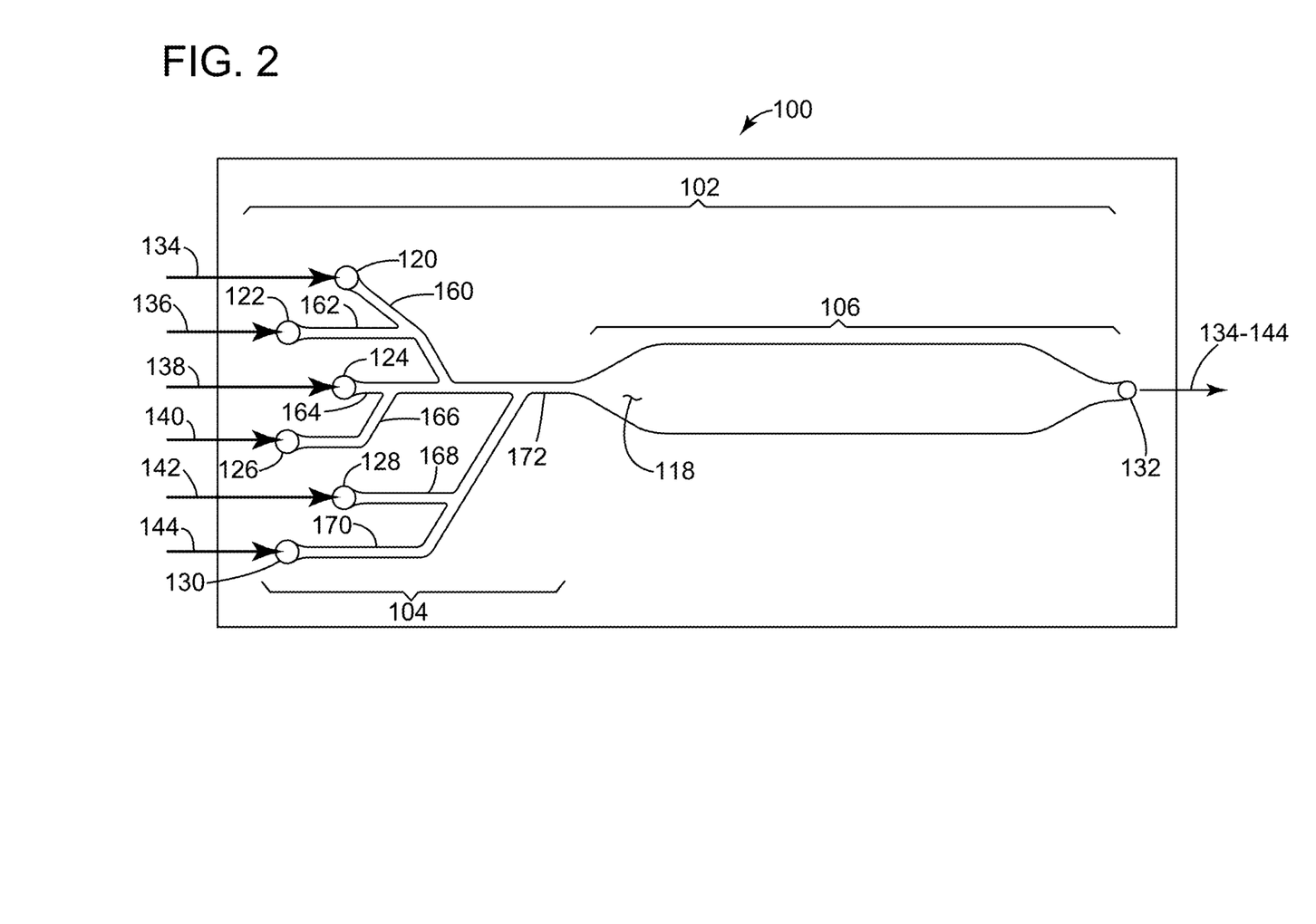
FIG. 2 depicts an example of a cross sectional view of the flow cell of FIG. 1B taken along the line 2-2 according to aspects disclosed herein.

Referring to FIG. 2, a cross sectional view of the flow cell 100 of FIG. 1B taken along the line 2-2 is depicted according to aspects disclosed herein. The flow cell 100 includes a plurality of inlet ports 120, 122, 124, 126, 128, 130 (herein, 120-130) and at least one outlet port 132, wherein the flow channel 102 is positioned therebetween.

Each inlet port 120-130 is sized to receive a flow (or flow path) of reagent (flow paths are represented by arrows 134, 136, 138, 140, 142, 144 (herein, 134-144) from one of a plurality of reagents 146, 148, 150, 152, 154, 156 (herein 146-156) (best seen in FIG. 5) into the flow cell 100. The outlet port 132 is sized to pass each flow path 134-144 of reagent out of the flow cell 100.

The flow channel 102 is positioned between, and in fluid communication with, each inlet port 120-130 and the outlet port 132. The flow channel 102 includes the manifold section 104 and the detection section 106, which are integrally connected and in fluid communication with each other.

The manifold section 104 has a plurality of manifold branches 160, 162, 164, 166, 168, 170 (herein 160-170) in fluid communication with a common line 172. Each branch (160-170) is respectively connected to one of each inlet port (120-130). The detection section 106 is in fluid communication with the common line 172 and the outlet port 132. The detection section 106 is operable to perform a plurality of different chemical reactions between the plurality of reagents 146-156 and analytes (not shown) positioned in the detection section 106. The analytes may be DNA segments, oligonucleotides, other nucleic-acid chains or the like.

The bottom surface 118 of the flow channel 102 is actually the top surface of the bottom layer 110 of the flow cell 100. Nanowells (not shown) may be patterned into the bottom surface 118 to capture the analytes. Alternatively, the bottom surface 118 may be coated with a surface treatment to capture the analytes. Also, a combination of nanowells and surface treatment may be used to capture the analytes.

The reagents 146-156 may be utilized to perform a large number of various controlled chemical reactions on the analytes disposed within the detection section 106. For example, the flow paths 134-144 of each reagent 146-156 may deliver an identifiable label (such as a fluorescently labeled nucleotide molecule or the like) that can be used to tag the analytes. Thereafter, an excitation light may be radiated through the top layer 108 and onto the analytes, causing the fluorescent labels tagged to the analytes to fluoresce emissive light photons. The emissive light photons may be detected by a detection module 266 of an instrument 200 (best seen in FIG. 6) during a detection process. (Note that, in this particular example, the detection module 266 is an imaging module used during an imaging process.) Device circuitry within the instrument 200 may then process and transmit data signals derived from those detected photons. The data signals may then be analyzed to reveal properties of the analytes.

Though the detection module 266 has been illustrated in this example as being an imaging module used for detecting photons of light, other forms of detection modules and detection schemes may be used to detect other forms of detectable properties related to the analytes. For example, the detectable properties related to the analytes may include electric charges, magnetic fields, electrochemical properties, pH changes or the like. Moreover, the detection module 266 may, without limitation, include sensing devices that can be either embedded in the flow cell 100, mounted in the instrument external to the flow cell 100 or any combination thereof.

Figure 3:
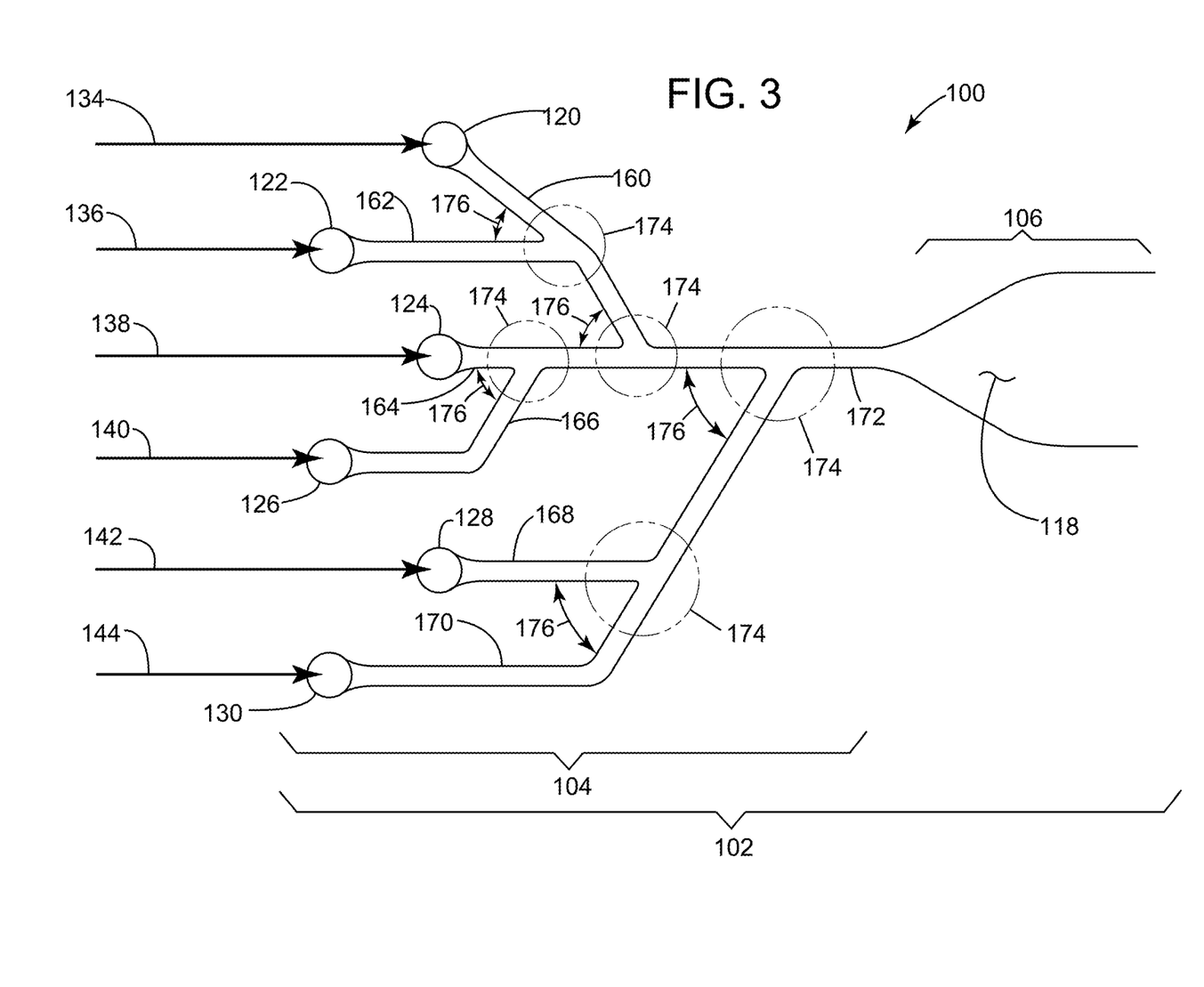
FIG. 3 depicts an example of an enlarged view of the manifold section of FIG. 2 according to aspects disclosed herein.

Referring to FIG. 3, an enlarged view of the manifold section 104 of FIG. 2 is depicted according to aspects disclosed herein. Advantageously, the manifold section 104 has a volume and geometry that significantly reduces, relative to pre-existing techniques, the amount of reagent flow (i.e., total flush volume) involved to flush the flow cell 100 and achieve a predetermined level of reagent concentration (i.e., flush efficiency) (best seen in graphs 180, 182 and 184 of FIG. 4) in the flow channel 102 of the flow cell 100.

One such example of a geometry that reduces flush factor to achieve a desired flush efficiency is in the way the manifold branches 160-170 connect to the common line 172. More specifically, the manifold branches 160-170 of the manifold section 104 are in fluid communication with the common line 172 through a plurality of forked junctions 174 which direct each flow path 134-144 or reagent through the common line 172 and into the detection section 106. In the implementations shown, the forked junctions 174 form acute angles 176 between branches 160-170, which contain flow paths of the plurality of flow paths 134-144 of the reagents 146-156. In some implementations, the forked junctions 174 can all be only acute angles 176 or only some of the forked junctions 174 can form acute angles 176.

The common line 172 is illustrated in FIG. 3 as a single common line that is in fluid communication between the manifold branches 160-170 and the detection section 106. However, the common line 172 may also be a plurality of common lines that are in fluid communication between the manifold branches 160-170 and the detection section 106 of the flow channel 102.

By forming the junctions 174 as acute angles 176 (i.e., angles that are less than 90 degrees), the amount of dead areas of flow at each junction can be reduced compared to that of the prior art. That is, the tendency of the flow paths 134-144 to form vortices, eddies, areas of slow laminar flow or the like is greatly reduced since there are less sharp bends that the flow paths may flow around. Since the dead areas can be difficult to flush out, the reduction of those dead areas also reduces the flush factor involved to achieve a predetermined flush efficiency.

Another example of a geometry that reduces flush factor to achieve a desired flush efficiency is that the manifold section 104 and the detection section 106 of the flow channel 102 are substantially on the same plane, or planar. As such, there are no discontinuities or level changes in the flow channel 102 that can induce dead areas of flow, such as vortices, eddies or the like.

The volume of the manifold section 104 is also conducive to reducing flush factor and increasing flush efficiency because the swept volume of the manifold section 104 is smaller than the swept volume of the detection section 106. More specifically, in some implementations, the manifold section 104 may have a swept volume that is at least about 10 times smaller than a swept volume of the detection section 106. Additionally, in some implementations, the manifold section 104 may have a swept volume that is at least about 20, 50, or 100 times smaller than a swept volume of the detection section 106. By virtue of small swept volume of the manifold section 104, there is less reagent that needs to be flushed to minimize, and in some instances even entirely eliminate, cross contamination of reagents.

The flow cell 100 includes a plurality of inlet ports 120-130, wherein each inlet port 120-130 is sized to receive a flow path 134-144 from one of a plurality of reagents 146-156 into the flow cell 100. Because, in some implementations, each inlet port 120-130 may receive only one reagent 146-156, then the reagent flow paths 134-144 may be kept separate when they are external to the flow cell and may have no external common lines that may be contaminated by other reagents. In other words, in an instrument 200 (best seen in FIGS. 5 and 6) that includes the flow cell 100, the manifold section 104 of the flow channel 102 may be the only common area in the instrument 200 where different flow paths 134-144 of different reagents 146-156 are routed together prior to flowing into the detection section 106 of the flow channel 102.

This means that only the flow channel 102 of the flow cell 100 positioned in an instrument 200 may need to be flushed to reduce, and in some instances entirely eliminate, cross contamination of reagents, because the reagents 146-156 have separate flow paths 134-144 external to the flow cell 100. It also means that the flush factor involved to achieve a predetermined flush efficiency for a flow cell 100 can be the same as the flush factor involved for the instrument 200 that includes the flow cell 100.

Figure 4:
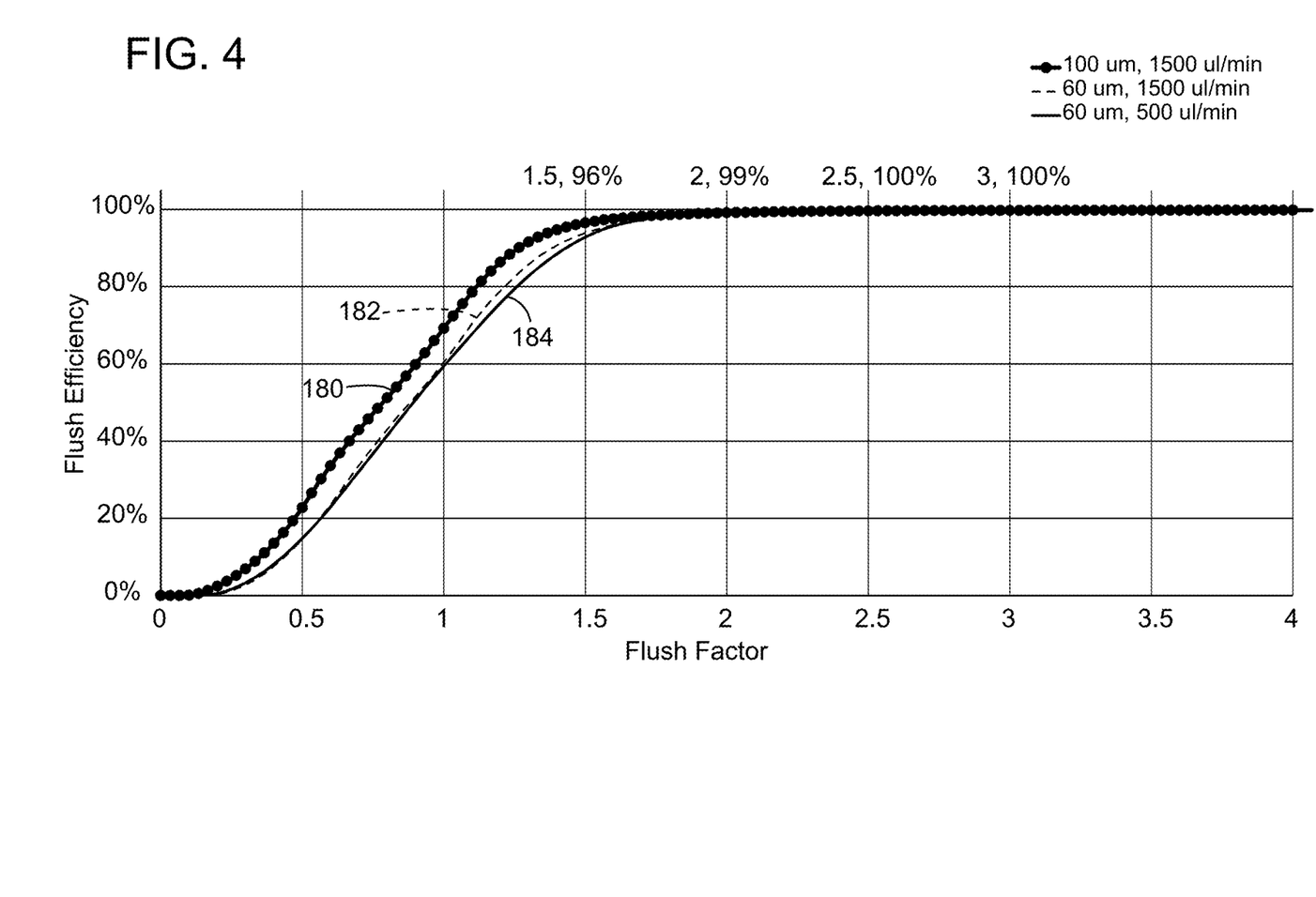
FIG. 4 depicts an example of various graphs of flush efficiency vs. flush factor according to aspects disclosed herein.

Referring to FIG. 4, various graphs 180, 182, 184 of flush efficiency vs. flush factor are depicted according to aspects disclosed herein. Flush efficiency, as used herein, is the percent concentration by volume of the flushing reagent that remains in the area of the flow channel where the analytes are located (such as, for example, the detection section) after a flushing operation. Flush factor, as used herein, is the volume of a reagent flushed through a component expressed in units of swept volume of that component.

More specifically, FIG. 4 illustrates three graphs 180, 182 and 184. Graph 180 is a plot of flush efficiency vs. flush factor of a flow channel 102 of a flow cell 100 in accordance with aspects disclosed herein, wherein the gap height 114 is 100 micrometers and the flow rate of the flushing reagent is 1500 microliters per minute. Graph 182 is a plot of flush efficiency vs. flush factor of a flow channel 102 of a flow cell 100 in accordance with aspects disclosed herein, wherein the gap height 114 is 60 micrometers and the flushing flow rate of the flushing reagent is 1500 microliters per minute. Graph 184 is a plot of flush efficiency vs. flush factor of a flow channel 102 of a flow cell 100 in accordance with aspects disclosed herein, wherein the gap height 114 is 60 micrometers and the flushing flow rate of the flushing reagent is 500 microliters per minute.

From the graphs 180, 182, 184, it can be seen that in all cases, the flow channel 102 comprises a swept volume and a geometry such that a flush factor, used to achieve a flush efficiency of at least about 99.95 percent concentration of a reagent positioned in the detection section 106, is about 3 or less—e.g., about 2.5 or less, about 2.3, or less (in units of swept volume). Additionally, a flush factor of 2.3 may achieve a flush efficiency of at least about 99.95%—e.g., at least about 99.96%, at least about 99.97%, at least about 99.98%, at least about 99.99%, at least about 99.995, or higher. Additionally, a flush factor of 2.5 may achieve a flush efficiency of at least about 99.95%—e.g., at least about 99.96%, at least about 99.97%, at least about 99.98%, at least about 99.99%, at least about 99.995%, or higher. Additionally, a flush factor of 3.0 may achieve a flush efficiency of at least about 99.95%—e.g., at least about 99.96%, at least about 99.97%, at least about 99.98%, at least about 99.99%, at least about 99.995%, or higher. Additionally, a flush factor of 2.0 may achieve a flush factor of at least about 99%—e.g., at least about 99.1%, at least about 99.2%, at least about 99.3%, at least about 99.4%, at least about 99.5%, or higher. Comparatively, in many instances pre-existing flow channels may involve flush factors of 4 to 5 units of swept volume of the pre-existing flow channel to achieve at least about 99.95 percent flush efficiency.

The low flush factor (e.g., 2.5 or less) to achieve such high flush efficiency (e.g., 99.95 or more) may be due to several features of the flow cell 100. For example, the manifold section 104 and detection section 106 are integrally part of the flow channel 102 within the flow cell 100 and are on the same plane, or planar. Further by example, each inlet port 120-130 of the flow cell 100 may receive only one reagent 146-156, such that the flow paths 134-144 of the reagents are not routed together until the manifold section 104. Additionally, by example, the manifold branches 160-170 of the manifold section 104 may form acute angles at the junctions 174. Also by example, the manifold section 104 has a swept volume that is at least about 10 times smaller than a swept volume of the detection section 106.

Moreover, because there is one inlet port 120-130 for each reagent 146-156, the reagents may be kept separate in an instrument 200 (best seen in FIGS. 5 and 6) that includes the flow cell 100. Accordingly, the manifold section 104 of the flow channel 102 includes the only common area in the instrument 200 where different flow paths 134-144 of different reagents 146-156 are routed together prior to flowing into the detection section 106 of the flow channel 102.

As such, the graphs 180, 182, 184 for the flow cell 100 may remain substantially unchanged regardless of the types of fluidic connections an instrument 200 utilizes to connect the reagents 146-156 to the flow cell 100. For example, the fluidic connections between reagent wells and the flow cell 100 may be rigidly connected with metal tubing that is substantially straight and level or the connections may be connected with tubing that is bent to accommodate different levels between reagent wells and the flow cell 100.

Referring to FIG. 5, an example of a schematic diagram of a cartridge 202 and an instrument 200 is depicted, wherein the cartridge 202 contains the flow cell 100 according to aspects disclosed herein. In this particular example, the instrument 200 is a cartridge-based sequencing instrument, wherein the cartridge 202 of the sequencing instrument 200 includes the flow cell 100 and a variety of reagent handling components. Additionally, the cartridge 202 may be detachable from the instrument 200 as a module and the flow cell 100 may, or may not, be detachable from the cartridge 202.

However, the flow cell 100 and reagent handling parts do not have to interface with the instrument 200 through a cartridge 202. Rather, they can be stand-alone components that are separately mounted in the instrument 200. Additionally, the reagent handling components may not be individually detachable from the instrument, while the flow cell 100 may be detachable from the instrument.

The cartridge 202 of the instrument 200 includes a plurality of reagent wells 204, 206, 208, 210, 212, 214 (herein, 204-214), wherein each reagent well is operable to contain a reagent of a plurality of reagents 146, 148, 150, 152, 154, 156 positioned therein. A plurality of well channels 216, 218, 220, 222, 224, 226 (herein, 216-226) extend from each respective reagent well 204-214 to a respective inlet port 120-130 of the flow cell 100, wherein each inlet port is in fluid communication with solely one reagent 146-156.

The reagents 146-156 may be any of several types or combinations of reagents depending on the type and sequence of the chemical reactions that are to be performed at the flow cell. For example, the reagents 146-156 may be of the following types:

Reagent 146 may be an incorporation mix, which is a mixture of chemicals that incorporates fluorescently-labeled nucleotides into DNA strands.

Reagent 148 may be a scan mix, which is a mixture of chemicals that stabilize DNA strands during a detection process.

Reagent 150 may be a cleave mix, which is a mixture of chemicals that enzymatically cleave fluorescently-labeled nucleotides from DNA strands.

Reagent 152 may be a first wash buffer, which is a mixture of wash reagents to remove the active reagents from a flow cell.

Reagent 154 may be a second wash buffer, which is another mixture of wash reagents to remove the active reagents from a flow cell.

Reagent 156 may be air.

The cartridge also includes a plurality of valves 228, 230, 232, 234, 236, 238 (herein, 228-238) positioned in the well channels 216-226. Each valve 228-238 is in fluid communication with one of each reagent well 204-214. Each valve 228-238 is operable to control the flow path 134, 136, 138, 140, 142, 144 of reagent from the reagent well 204-214 that the valve 228-238 is in communication with. In the particular example illustrated in this FIG. 5, the valves are pinch valves. However other types of valves may also be used, for example, solenoid valves, ball valves or the like. In the specific configuration of FIG. 5, the instrument 200 does not include a rotary valve, which would select the various reagents 146-156 and merge the flow paths 134-144 of the of the reagents into a common line prior to entering the flow cell 100.

The flow cell 100 is positioned within the instrument 200 and may, or may not, be detachable from the cartridge 202. Moreover, the flow cell 100 may also be detachable from the instrument 200 if no cartridge 202 was utilized.

The flow cell 100 includes a plurality of inlet ports 120, 122, 124, 126, 128, 130 and an outlet port 132. Each inlet port 120-130 is in fluid communication with a corresponding valve 228-238 via the respective well channel 216-226. Each inlet port 120-130 is sized to receive one of each flow path 134-144 of reagent, respectively. The well channels 216-226 may be in a variety of configurations. For example, the well channels 216-226 may be primarily metal tubing that rigidly connects the reagent wells 204-214 to the inlet ports 120-130. Alternatively, the well channels 216-226 may be plastic tubing that connects the reagent wells 204-214 to the inlet ports 120-130. The outlet port 132 of the flow cell 100 is sized to pass each flow path 134-144 of reagent out of the flow cell 100.

The flow cell 100 includes a flow channel 102 that is positioned between, and in fluid communication with, each inlet port 120-130 and the outlet port 132. The flow channel 102 includes a manifold section 104 and a detection section 106.

The manifold section 104 has a plurality of manifold branches 160, 162, 164, 166, 168, 170 in fluid communication with a common line 172. Each manifold branch 160-170 is connected to an inlet port 120-130.

The detection section 106 is in fluid communication with the common line 172 and the outlet port 132. The detection section 106 is operable to perform a plurality of different chemical reactions between the plurality of reagents 146-156 and analytes positioned in the detection section 106.

The reagent flow paths 134-144 are kept separated from each other until they enter the flow cell 100. As such, the manifold section 106 of the flow channel 102 includes the only common areas in the instrument 200 where different flow paths 134-144 of different reagents 146-156 are routed together prior to flowing into the detection section 106 of the flow channel 102. Accordingly, only the flow channel 102 needs to be flushed in order to minimize, and in some instances even entirely eliminate, cross contamination of reagents between chemical reactions. This helps to reduce the flush factor, and therefore the total flush volume of flushing reagent used to achieve a predetermined concentration of flushed reagent (flush efficiency) in the flow channel 102.

Additionally, external to the flow cell 100, where the reagent flow paths 134-144 are kept separated, the reagent flow paths may flow across more than one level. For example, the reagent wells 146-156 may be located within the instrument 200 at a higher level than that of the flow cell 100. However, internal to the flow cell 100, where the reagent flow paths 134-144 may mix, the manifold section 104 and the detection section 106 of the flow channel 102 are substantially on the same plane, or planar. This helps to reduce the potential dead areas within the flow channel 102 and therefore also helps to reduce the flush factor used to achieve a predetermined flush efficiency.

The outlet port 132 of the flow cell 100 is in fluid communication with a first pump pinch valve 240. The first pump pinch valve 240 is in fluid communication with a second pump pinch valve 242.

An onboard pump 244 (such as a syringe pump, or similar) is also disposed on the cartridge 202. Even though the onboard pump 244 may be other types of pumps, it will be referred to herein as the syringe pump 244. The syringe pump 244 is connected in a tee formation between the first pump pinch valve 240 and the second pump pinch valve 242. Both the first pump pinch valve 240 and the second pump pinch valve 242 are opened and closed by the instrument 200 to engage or disengage the syringe pump 244 from the flow cell 100.

The syringe pump 244 includes a reciprocating plunger 246 disposed in a cylinder 248, which has a cylinder bore 250. The plunger 246 is received within the cylinder bore 250 to form a plunger-cylinder bore seal. The plunger 246 is driven by the instrument 200 to reciprocate within the cylinder bore 250 and to pump reagent from the reagent wells 204-214 to a waste tank 252.

Referring to FIG. 6, an example of a schematic block diagram of the instrument 200 containing the detachable cartridge 202 of FIG. 5 is depicted according to aspects disclosed herein. The instrument 200 includes a docking station 260 to receive the cartridge 202. Various electrical and mechanical assemblies within the instrument 200 interact with the cartridge 202 to operate the cartridge 202 during sequencing operations performed by the instrument 200.

The instrument 200 may include, among other things, one or more processors 262 that are to execute program instructions stored in a memory 264 in order to perform the sequencing operations. The processors 262 are in electronic communication to, among other things, a detection module 266, a syringe pump drive assembly 268 and a pinch valve drive assembly 270.

A user interface 272 is provided for users to control and monitor operation of the instrument 200. A communications interface 274 conveys data and other information between the instrument 200 and remote computers, networks and the like.

The syringe pump drive assembly 268 includes a syringe pump motor 276 coupled to an extendable shaft 278. The extendable shaft 278 is driven by the syringe pump motor 276 between an extended position and a retracted position to reciprocate the plunger 246 within the cylinder bore 250 of the cylinder 248 on the syringe pump 244.

The pinch valve drive assembly 270 includes a set of eight pneumatically driven pinch valve drive motors 280. Six of the pinch valve drive motors 280 are mechanically coupled to the pinch valves 228-238. Two of the pinch valve drive motors are mechanically coupled to the first and second pump pinch valve 240, 242. The pinch valve drive motors 280 may utilize air pressure to pinch off or release a resilient central portion of the pinch valves 228-238, 240, 242 to pneumatically open and close the pinch valves. Alternatively, the pinch valve drive motors 280 may be electrically driven.

The detection module 266 contains all of the cameras and light detecting sensors to enable the detection of emissive light photons emitted from analytes in the flow cell 100. Device circuitry (not shown) within the instrument 200 may then process and transmit data signals derived from those detected photons. The data signals may then be analyzed to reveal properties of the analytes.

Referring to FIG. 7, an example of a method of performing a sequence of experiments utilizing a flow cell 100 is depicted according to aspects disclosed herein. The method utilizes an instrument 200 having a flow cell 100. The instrument 200 includes a plurality of reagent wells 204-214 that contain a plurality of reagents 146-156. Each reagent well 204-214 is in fluid communication with a single inlet port of a plurality of inlet ports 120-130 on the flow cell 100 such that the flow paths 134-144 of the reagents do not mix until they enter the flow cell 100. The flow cell 100 includes a flow channel 102 having a manifold section 104 integrally connected to a detection section 106. The manifold section 106 receives the reagents 146-156 and routes them through a common line 172 to the detection section 106. Analytes are positioned in the detection section 106 wherein multiple chemical reactions are performed between the analytes and reagents 146-156. Because of the geometry of the instrument 200 and flow cell 100, the flush factor (in units of swept volume), and therefore the amount of reagent flow (i.e., total flush volume) used to flush the flow cell 100 and achieve a predetermined level of reagent concentration (i.e., flush efficiency) in the flow channel 102 of the flow cell 100 is reduced relative to prior art flow cells.

The method begins (at step 300) by connecting a flow cell 100 to an instrument 200. The flow cell 100 includes a plurality of inlet ports 120-130, an outlet port 132 and a flow channel 102 in fluid communication therebetween. The flow channel 102 includes a manifold section 104 and a detection section 106. Some features of the geometry and architecture of the flow cell 100 and instrument 200 that decrease flush factor and increase flush efficiency are as follows:

The manifold section 104 and detection section may be on the same plane.

The swept volume of the manifold section 104 may be at least about 10 times smaller than the swept volume of the detection section 106.

Manifold branches 160-170 within the manifold section 104 may form acute angles at junctions 174.

Each inlet port 120-130 may receive one reagent 146-156 flowing through one reagent flow path 134-144.

The manifold section 104 of the flow channel 102 may include the only common areas in the instrument 200 where different flow paths 134-144 of different reagents 146-156 are routed together prior to flowing into the detection section 106 of the flow channel 102.

The method continues (at step 302) by operating a first valve of a plurality of valves 228-238 of the instrument 200 to select a first reagent of a plurality of reagents 146-156. Each reagent is positioned in a reagent well 204-214 of the instrument 200.

The method continues (at step 304) by pumping the first reagent through a first inlet port of the plurality of inlet ports 120-130 and through the flow channel 102 of the flow cell 100. The pumping may be accomplished with a variety of suitable pumps. In the example illustrated in FIG. 5, the pump is a syringe pump 244.

The method continues (at step 306) by performing a first chemical reaction between the first reagent and analytes positioned in the detection section 106 of the flow channel 102. After the first chemical reaction is completed, a portion of the first reagent will remain in the flow channel as a remaining reagent. That remaining reagent may have to be flushed out of at least the detection section 104 of the flow channel 102 in order to minimize, and in some instances even entirely eliminate, cross contamination with other reagents of the plurality of reagents 146-156 used in the predetermined sequence of chemical reactions.

The method continues (at step 308) by operating a subsequent valve of the plurality of valves 228-238 to select a subsequent reagent of the plurality of reagents 146-156.

The method continues (at step 310) by pumping the subsequent reagent through a subsequent inlet port of the plurality of inlet ports 120-130 and through the flow channel 102 to flush out the remaining reagent from the flow channel 102 such that a concentration of at least about 99.95 percent (i.e., a flush efficiency of at least about 99.95 percent) of the subsequent reagent positioned in the detection section 104 is achieved in a total flush volume of the subsequent reagent that is equal to about 2.5 times a swept volume (i.e., a flush factor of about 2.5) of the flow channel 102 or less. This low flush factor of 2.5 and high flush efficiency of 99.95 percent is achievable due at least in part to the features discussed earlier at (300). Alternatively, (at step 310), for some subsequent reagents, the method may use only a flush factor of about 2.0 or less to flush out the remaining reagent from the flow channel 102 such that a concentration of at least about 99 percent (i.e., a flush efficiency of at least about 99 percent) of the subsequent reagent is achieved.

The method then continues (at step 312) by performing a subsequent chemical reaction between the subsequent reagent and the analytes positioned in the detection section 106 after the concentration of at least about 99.95 percent (or alternatively, for some subsequent reagents, at least about 99 percent) of the subsequent reagent positioned in the detection section 106 has been achieved. After the subsequent chemical reaction is completed, a portion of the subsequent reagent will remain in the flow channel as a remaining reagent. That remaining reagent may have to be flushed out of at least the detection section 104 of the flow channel 102 in order to minimize, and in some instances even entirely eliminate, cross contamination with other reagents of the plurality of reagents 146-156 used in the predetermined sequence of chemical reactions.

The method then iterates (as illustrated by step 314) by returning (to step 308) to repeat the operating a subsequent valve (step 308), pumping the subsequent reagent (step 310) and performing a subsequent chemical reaction (step 312) for a predetermined sequence of reagents of the plurality of reagents 146-156 in a predetermined sequence of chemical reactions.

With each iteration (step 314) the method may continue in a variety of ways depending on the type of reagent selected. More specifically, the method may continue based on functional effects caused by the chemical reactions between the analytes and the various reagents.

For example, the method may continue by incorporating fluorescently-labeled nucleotides into analytes that include DNA strands (i.e., DNA strand analytes). This can be achieved with an incorporation mix, such as reagent 146 or similar.

Also by way of example, the method may continue by stabilizing the DNA strand analytes during a detection process. This can be achieved with a scan mix, such as reagent 148 or similar.

Also by way of example, the method may continue by enzymatically cleaving the fluorescently-labeled nucleotides from the DNA strand analytes. This can be achieved with a cleave mix, such as reagent 150 or similar.

Not every flushing reagent will require a flush efficiency of about 99.95 percent or greater (or alternatively, for some subsequent reagents, a flush efficiency of about 99 percent or greater) prior to performing a chemical reaction between that reagent and the analytes positioned in the flow channel 102. For example, if two wash buffer reagents were used in sequence, the second wash buffer may only require a flush efficiency of about 96 percent or greater. Also for example, if the reagent is air, that may be used to perform scheduled in-situ testing, the flush efficiency may only be about 96 percent. However, in any given sequence of reagents, the majority of subsequent reagents more than likely may require a flush efficiency of 99.95 percent or more (or alternatively, for some subsequent reagents, a flush efficiency of about 99 percent or greater). This may be especially the case when the subsequent reagents are not wash buffers or air. More specifically, this may be the case when the subsequent reagents are one of an incorporation mix, a cleave mix and a scan mix.

By enabling the achievement of flush efficiencies of at least about 99.95 percent with flush factors of about 2.5 or less (or alternatively, for some subsequent reagents, of at least about 99 percent with flush factors of about 2.0 or less) (particularly for non-wash buffer reagents or non-air reagents), the consumption of expensive reagents is reduced and the time elapsed to complete a sequence of controlled chemical reactions is shortened significantly relative to the prior art. By enabling the achievement of flush efficiencies of about 99.95 percent or more with flush factors of about 2.5 or less (again, particularly with non-wash buffer reagents or non-air reagents), the consumption of such expensive reagents is even further reduced and the time elapsed to complete the sequence of controlled reactions is even further shortened.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the forgoing disclosure has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A method comprising:
   connecting a flow cell to an instrument, the flow cell comprising a plurality of inlet ports, an outlet port and a flow channel in fluid communication therebetween, the flow channel comprising a manifold section having a manifold section swept volume and a detection section having a detection section swept volume, wherein a ratio of the detection section swept volume to manifold section swept volume is at least about 10 to 1;
   operating a first valve of a plurality of valves of the instrument to select a first reagent of a plurality of reagents, each reagent positioned in a reagent well of one of a cartridge or the instrument;
   pumping the first reagent through a first inlet port of the plurality of inlet ports and through the flow channel of the flow cell;
   performing a first chemical reaction between the first reagent and analytes positioned in the detection section of the flow channel, wherein at least some of the first reagent remains in the flow channel as a remaining reagent after completion of the first chemical reaction;
   operating a subsequent valve of the plurality of valves to select a subsequent reagent of the plurality of reagents; and
   pumping the subsequent reagent through a subsequent inlet port of the plurality of inlet ports and through the flow channel to flush out the remaining reagent from the flow channel, wherein, due at least in part to the ratio of the detection section swept volume to the manifold section swept volume being at least about 10 to 1, a concentration of at least about 99.95 percent of reagent positioned in the detection section is the subsequent reagent, after pumping a total volume of the subsequent reagent through the flow channel that is equal to or less than about 2.5 times a total swept volume of the manifold section plus the detection section.

2. The method of claim 1, comprising:
   performing a subsequent chemical reaction between the subsequent reagent and the analytes positioned in the detection section after the concentration of at least about 99.95 percent of the subsequent reagent positioned in the detection section has been achieved, wherein at least some of the second reagent remains in the flow channel as the remaining reagent after completion of the subsequent chemical reaction.

3. The method of claim 2, comprising repeating the operating a subsequent valve, the pumping the subsequent reagent and the performing a subsequent chemical reaction one or more times.

4. The method of claim 1, comprising:
   configuring the manifold section with a plurality of manifold branches in fluid communication with a common line, the manifold section having a swept volume comprising a swept volume of the plurality of manifold branches and the common line, each manifold branch of the plurality of manifold branches connected to a corresponding inlet port of the plurality of inlet ports; and
   configuring the detection section such that it is in fluid communication with the common line and the outlet port.

5. The method of claim 4, comprising:
   configuring the plurality of manifold branches to be in fluid communication with the common line through a plurality of forked junctions, each of the plurality of forked junctions directing a corresponding flow of reagent through the common line and into the detection section, wherein the forked junctions form only acute angles between the manifold branches.

6. The method of claim 1, comprising:
   configuring the manifold section and the detection section of the flow channel to be substantially planar.

7. The method of claim 1, comprising:
   providing a top layer defining a top surface of the flow channel;
   providing a bottom layer defining a bottom surface of the flow channel; and
   providing an intermediate layer defining a geometry of the flow channel.

8. The method of claim 7, comprising:
   providing a gap height, wherein the gap height is defined by a distance between the bottom surface of the flow channel and the top surface of the flow channel, wherein the gap height is substantially constant throughout the flow channel and is within a range of about 60 to 100 microns.

9. The method of claim 1, comprising:
   pumping the subsequent reagent through a subsequent inlet port of the plurality of inlet ports and through the flow channel to flush out the remaining reagent from the flow channel, wherein, due at least in part to the ratio of the detection section swept volume to the manifold section swept volume being at least about 10 to 1, a concentration of at least about 99 percent of reagent positioned in the detection section is the subsequent reagent, after pumping a total volume of the subsequent reagent through the flow channel that is equal to or less than about 2.0 times a total swept volume of the manifold section plus the detection section.

10. The method of claim 1, comprising:
    positioning each valve of the plurality of valves between a corresponding reagent well of the plurality of respective reagent wells and a corresponding inlet port of the plurality of inlet ports such that each valve controls a flow of reagent from the corresponding reagent well of the plurality of respective reagent wells.

11. The method of claim 1, comprising:
    configuring the swept volumes of the detection section and the manifold section such that the ratio of the detection section swept volume to manifold section swept volume is at least about 20 to 1.

12. The method of claim 1, comprising:
    configuring the swept volumes of the detection section and the manifold section such that the ratio of the detection section swept volume to manifold section swept volume is at least about 50 to 1.

13. The method of claim 1, comprising:
    configuring the swept volumes of the detection section and the manifold section such that the ratio of the detection section swept volume to manifold section swept volume is at least about 100 to 1.

* * * * *

UNITED STATES PATENT AND TRADEMARK OFFICE
CERTIFICATE OF CORRECTION

PATENT NO. : 11,951,477 B2
APPLICATION NO. : 17/809604
DATED : April 9, 2024
INVENTOR(S) : Lin et al.

Page 1 of 1

It is certified that error appears in the above-identified patent and that said Letters Patent is hereby corrected as shown below:

In the Specification

In Column 1, Line 12, after "application" insert -- No. --.

Signed and Sealed this
Fourth Day of February, 2025

Coke Morgan Stewart
*Acting Director of the United States Patent and Trademark Office*